(12) United States Patent
Garcia

(10) Patent No.: US 7,025,204 B2
(45) Date of Patent: Apr. 11, 2006

(54) REUSABLE APPARATUS FOR SHIPPING SEATING UNITS

(75) Inventor: Michael A. Garcia, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/405,855

(22) Filed: Apr. 2, 2003

(65) Prior Publication Data

US 2004/0195126 A1 Oct. 7, 2004

(51) Int. Cl.
*B65D 85/00* (2006.01)

(52) U.S. Cl. .................... 206/326; 206/745
(58) Field of Classification Search ............ 206/326, 206/784, 745, 747, 748, 749, 750, 757, 756, 206/759, 525.1; 229/103.2; 53/544, 540, 53/461

See application file for complete search history.

(56) References Cited

U.S. PATENT DOCUMENTS

| 2,331,753 | A | * | 10/1943 | Wohlers | ..................... 206/326 |
| 3,338,501 | A | | 3/1966 | Clay | |
| 3,651,934 | A | * | 3/1972 | Roberts et al. | ............. 206/326 |
| 3,729,893 | A | * | 5/1973 | Bobb | .......................... 53/442 |
| 4,111,301 | A | | 9/1978 | English | |
| 4,170,297 | A | | 10/1979 | Johnson | |
| 4,185,741 | A | * | 1/1980 | Schiff et al. | ................. 206/326 |
| 4,574,998 | A | * | 3/1986 | Vavra | ...................... 229/103.2 |
| 4,705,162 | A | * | 11/1987 | Kupersmit | .................. 206/745 |
| 4,871,061 | A | | 10/1989 | Schneider et al. | |
| 6,523,692 | B1 | * | 2/2003 | Gregory | ..................... 206/746 |
| 2002/0100396 | A1 | | 8/2002 | Richard | |

FOREIGN PATENT DOCUMENTS

DE 296 07 874 U 7/1996

* cited by examiner

Primary Examiner—Jacob K. Ackun
Assistant Examiner—J Williams
(74) Attorney, Agent, or Firm—Robert R. Richardson, P.S.

(57) ABSTRACT

The invention provides a reusable apparatus for shipping seating units. The apparatus comprises first and second seat holding members. The first seat holding member includes a first base portion and a first back portion. The second seat holding member includes a second base portion and a second back portion. The first back portion is rotatably attached to the second base portion. A first seating unit secured to the first base portion and a second seating unit secured to the second base portion may be rotated such that the seating units are inverted with respect to each other and the first base portion is adjacent the second back portion.

18 Claims, 5 Drawing Sheets

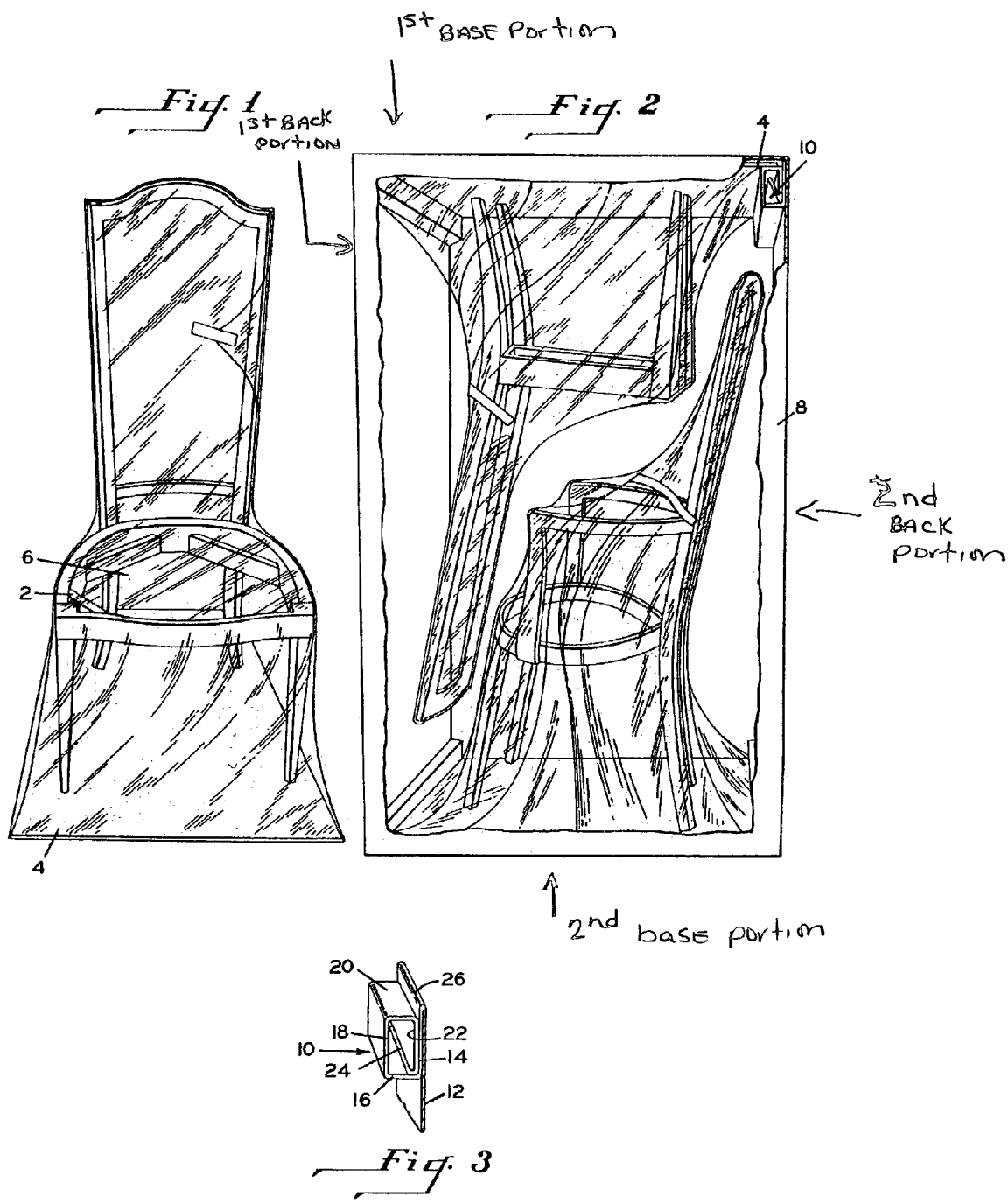

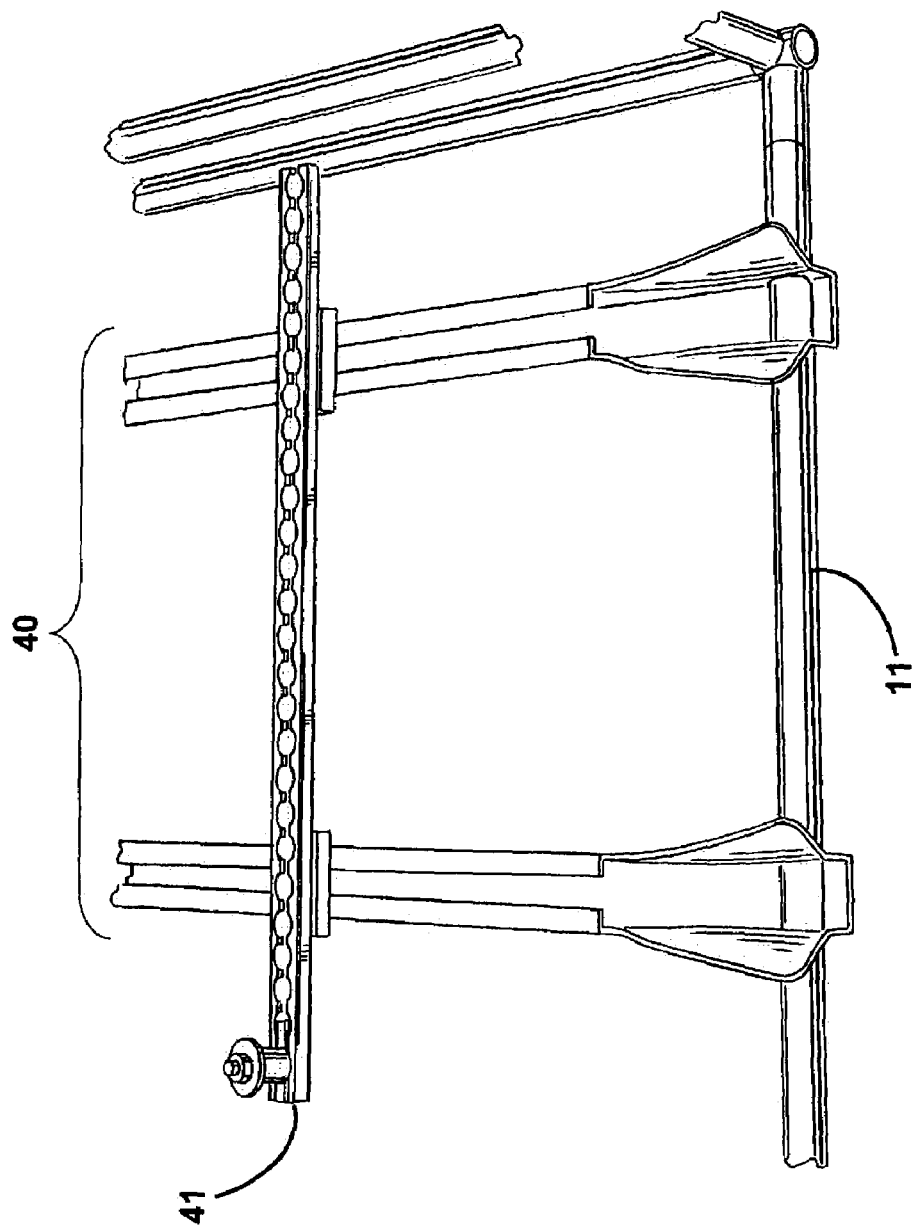

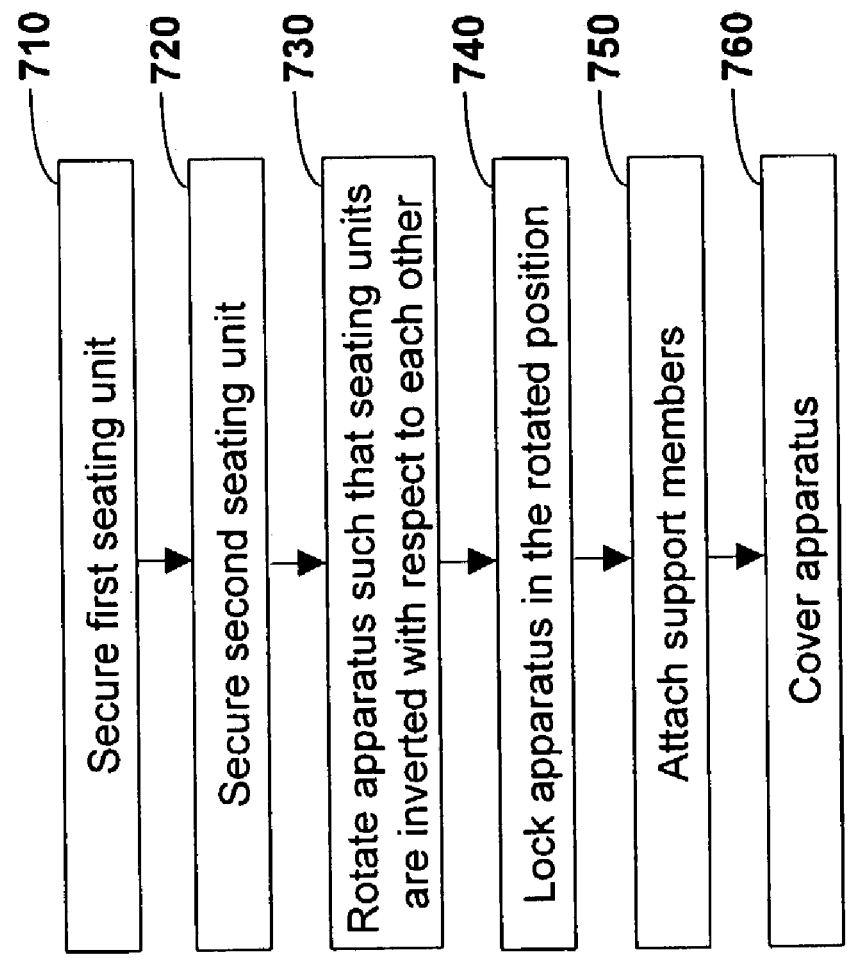

REUSABLE APPARATUS FOR SHIPPING SEATING UNITS

FIELD OF THE INVENTION

This invention relates generally to shipping containers. More specifically, the invention relates to an apparatus that is designed to be a reusable container for shipping seating units.

BACKGROUND OF THE INVENTION

Various containers are currently available for shipping and storing chairs and seats for vehicles such as automobiles, buses, and airplanes. These containers are designed to hold either a single seating unit or multiple units. Typically, multiple seating units are arranged with one unit upright and the other unit inverted. The two seating units are nested facing each other, with the top (or seat back) of each unit adjacent the base of the other unit.

An L-shaped shipping container for a single chair or other article of furniture is disclosed in U.S. Pat. No. 4,871,061. A shipping container designed to accommodate a pair of chairs arranged in the nested configuration described above is disclosed in U.S. Pat. No. 4,170,297. These patents note a number of disadvantages of the prior art, including the amount of time and manual labor involved in assembling and sealing containers for shipment and in unpacking and disassembling the containers after receipt, the amount of excess paperboard used in forming and reinforcing containers, the failure of containers to adequately protect the contents, and the amount of excess space taken up by containers. An additional disadvantage that is not mentioned in or solved by these patents is the time and costs involved in disposing of the used container materials, either as garbage or by recycling.

It would be desirable, therefore, to provide a reusable container for shipping seating units that overcomes the aforementioned and other disadvantages.

SUMMARY OF THE INVENTION

One aspect of the invention provides a reusable apparatus for shipping seating units. The apparatus comprises first and second seat holding members. The first seat holding member includes a first base portion and a first back portion. The second seat holding member includes a second base portion and a second back portion. The first back portion is rotatably attached to the second base portion. A first seating unit secured to the first base portion and a second seating unit secured to the second base portion may be rotated such that the seating units are inverted with respect to each other and the first base portion of the apparatus is adjacent the second back portion of the apparatus.

Another aspect of the invention provides a method of preparing seating units for shipment. The method comprises securing a first seating unit in an upright position to an apparatus for shipping seating units, securing a second seating unit in an upright position to the apparatus, and rotating at least a portion of the apparatus to a position such that the seating units are inverted with respect to each other.

A further aspect of the invention provides a system for preparing seating units for shipment, comprising means for securing a first seating unit in an upright position to an apparatus for shipping seating units, means for securing a second seating unit in an upright position to the apparatus, and means for rotating at least a portion of the apparatus to a position such that the seating units are inverted with respect to each other.

The aforementioned, and other features and advantages of the invention, will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 is an illustration of the framework of one embodiment of a reusable apparatus for shipping seating units, in accordance with the current invention;

FIG. 2 is an illustration of seating units in place on the apparatus shown in FIG. 1;

FIG. 3 is an illustration showing the apparatus of FIGS. 1 and 2 partially rotated;

FIG. 6 is a fragmentary view of one embodiment of a device for releasably holding a seating unit to the apparatus of FIGS. 1–5; and FIG. 7 is a flow diagram of one embodiment of a method of preparing seating units for shipment using an example apparatus in accordance with the current invention.

DETAILED DESCRIPTION OF THE PRESENTLY PREFERRED EMBODIMENTS

Figure 4:
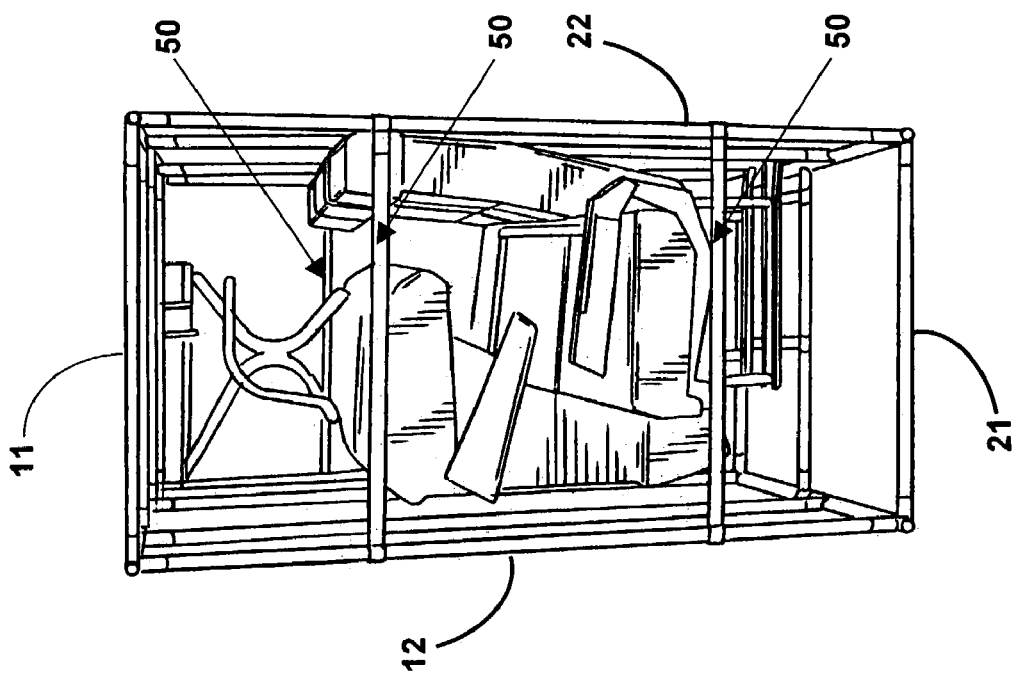
FIG. 4 is an illustration showing the apparatus of FIGS. 1–3 fully rotated and in position for shipping.

FIG. 1 shows an illustration of the framework of one embodiment of a reusable apparatus for shipping seating units, in accordance with the current invention. The framework comprises a first seat holding member 10, including a first base portion 11 and a first back portion 12, and a second seat holding member 20, including a second base portion 21, and a second back portion 22.

Base portions 11 and 21 are the portions of the framework to which the bases of the seating units are affixed. The bases of the seating units may be pedestals, legs, or any appropriate base for a seating unit.

Back portions 12 and 22 are those portions of the apparatus that support and protect the backs of the seating units. Back portions 12 and 22 are slidably adjustable to allow for different heights of seating units and to permit the apparatus to be collapsed into a smaller configuration than would be possible if the back portions were entirely fixed.

First seat holding portion 10 is rotatably attached to second seat holding portion 20. Base portions 11 and 21 may also be rotatably attached to their respective back portions 12 and 22. Alternatively, base portion 11 may be substantially perpendicular to back portion 12, and base portion 21 may be substantially perpendicular to back portion 22. However, this configuration would not permit the apparatus to be fully extended as shown in FIG. 1, nor could it be fully collapsed for storage or return to the shipper.

The apparatus may be constructed using any strong, rigid material, for example a metal or a polycarbonate. To reduce the weight of the apparatus, a lightweight metal such as aluminum may be desirable.

FIG. 2 is an illustration of seating units 30 in place on the apparatus shown in FIG. 1. One seating unit is shown in place on base portion 11, and three seating units are shown in place on base portion 21. However, those skilled in the art will recognize that the dimensions of the apparatus may be varied to accommodate any number of seating units, with the dimensions depending on the desired size and weight of the apparatus plus the seating units.

In this embodiment, a device 40 for releasably holding the seating units slidably receives at least a portion of the base of each seating unit. The dimensions of the device may be chosen to accommodate the appropriate number of seating units. Those skilled in the art will appreciate that many possible means for releasably holding the seating units are possible. For example, a spring-loaded clip may also fit around a portion of the base of a seating unit.

FIG. 3 is an illustration showing the apparatus of FIGS. 1 and 2 partially rotated. Base portion 11 has been rotated such that the backs of the seating units attached to base portion 11 are now adjacent back portion 12. Back portion 22 has been rotated such that it is adjacent the backs of the seating units attached to base portion 21.

FIG. 4 is an illustration showing the apparatus of FIGS. 1–3 fully rotated and in position for shipping. The seating units are now inverted with respect to each other, and base portion 11 is now adjacent back portion 22. A locking device known in the art may be used to releasably lock base portion 11 to back portion 22.

One or more lift-assist devices may be operably attached to the apparatus to aid in any or all of the rotations. With the addition of a lift-assist device, for example a hydraulic cylinder, seating units may be rotated and prepared for shipment by a single worker or may even be automatically rotated when initiated by a worker.

Once the apparatus has been fully rotated and in position for shipping, one or more support members 50 may be attached to the apparatus to releasably connect back portions 12 and 22. Such support members may be made of the same material used to construct the apparatus framework, or they may be panels constructed of, for example, polycarbonate. Multiple support members may be used to ensure that the apparatus is adequately stable and rigid.

A panel may be attached to each base portion and back portion, either before or after assembly of the apparatus. The panels may comprise a material such as polycarbonate that can withstand the rigors of shipment and will provide protection for the enclosed seating units. Transparent or translucent panels would permit the number of enclosed seating units to be viewed.

A covering made of canvas or plastic, for example, may be placed over the apparatus to further protect the seating units from being damaged or soiled during shipping.

Figure 5:
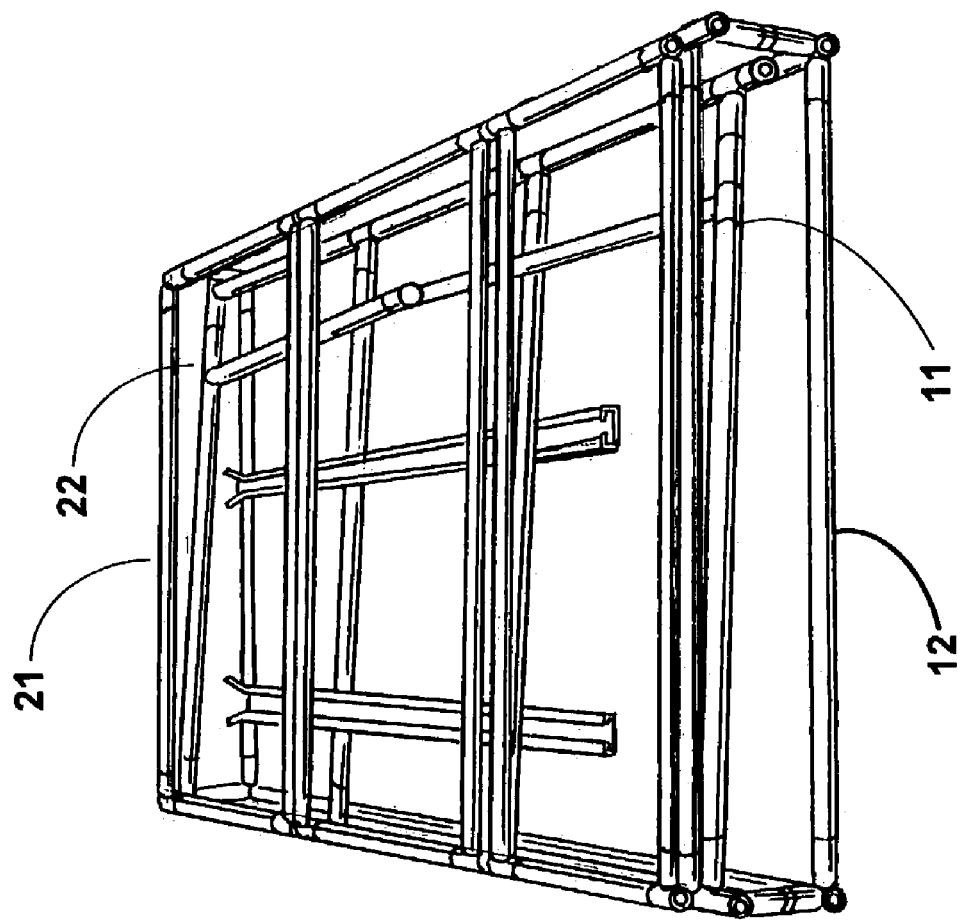
FIG. 5 is an illustration showing the apparatus of FIGS. 1–4 fully collapsed and in position for storage or return to the shipper.

FIG. 5 is an illustration showing the apparatus of FIGS. 1–4 fully collapsed and in position for storage or return to the shipper. Back portions 12 and 22 have been slidably adjusted to their smallest dimensions, and the back and base portions have been rotated such that they are all adjacent one another.

FIG. 6 is a fragmentary view showing a device 40 for slidably receiving and releasably holding one or more seating units to the apparatus of FIGS. 1–5. Those skilled in the art will appreciate that many possible means for releasably holding the seating units are possible. A locking device 41 may be added to prevent the seating units from sliding back out of the holding device.

FIG. 7 at 700 shows a flow diagram of one embodiment of a method of preparing seating units for shipment using an example apparatus according to FIGS. 1–6. Method 700 comprises steps to secure a first seating unit in an upright position to an apparatus for shipping seating units, secure a second seating unit in an upright position to the apparatus, rotate at least a portion of the apparatus to a position such that the seating units are inverted with respect to each other, lock the apparatus in the rotated position, attach support members to the apparatus, and cover the apparatus.

The user may secure a first seating unit in an upright position to the apparatus for shipping seating units (Block 710). This may be accomplished by, for example, sliding the runners of an airplane seat into a holding device affixed to a first base portion of the apparatus. The device may then be locked to ensure the runners remain in place and the seat remains stationary during shipment. The second seating unit may be secured in the same manner to a second base portion (Block 720).

The user may then rotate the apparatus such that the seating units are inverted with respect to each other (Block 730). This may be accomplished by rotating the first base portion and the attached first seating unit until the seat is in a prone position, with the back of the first seating unit resting on a first back portion of the apparatus. The first base portion, the attached first seating unit, and the first back portion may then be rotated such that the first seating unit is in an inverted position with respect to the second seating unit. The second back portion may then be rotated such that it is adjacent the first base portion. One or more lift-assist devices may assert a lift-assist force to the apparatus to facilitate any or all of the rotations.

The apparatus may be locked in the rotated position using a locking device by locking the first base portion to the second back portion (Block 740). Support members may be attached that connect the first back portion with the second back portion (Block 750). The support members may be tubular members such as those seen in FIG. 4, or they may be panels constructed of, for example, polycarbonate. Multiple support members may be used to ensure that the apparatus is adequately stable and rigid. A covering made of canvas or plastic, for example, may be placed over the apparatus to further protect the seating units from being damaged or soiled during shipping (Block 760).

The seating units may be unpacked after shipping and receipt by following the above steps in reverse order. The apparatus may then be collapsed as seen in FIG. 5 for storage or for shipment back to the supplier for use in future shipments.

While the embodiments of the invention disclosed herein are presently considered to be preferred, various changes and modifications can be made without departing from the spirit and scope of the invention. The scope of the invention is indicated in the appended claims, and all changes and modifications that come within the meaning and range of equivalents are intended to be embraced therein.

What is claimed is:

1. A reusable apparatus for shipping seating units, comprising:
   a first seating holding member including a first base portion and a first back portion; and
   a second seat holding member including a second base portion and a second back portion, the first back portion rotatably attached to the second base portion, wherein a first seating unit secured to the first base portion and a second seating limit secured to the second base portion may be rotated such that the seating units are inverted with respect to each other and the first base portion is adjacent the second back portion; and at least one support member, wherein the at least one support member releasably connects the first back portion with the second back portion.

2. The apparatus of claim 1 further comprising:
a removable covering means that encloses at least a portion of the apparatus.

3. The apparatus of claim 1 wherein the first back portion and the first base portion are rotatably attached to each other, and the second back portion and the second base portion are rotatably attached to each other.

4. The apparatus of claim 1 wherein the first base portion is substantially perpendicular to the first back portion and the second base portion is substantially perpendicular to the second back portion.

5. The apparatus of claim 1 wherein at least one dimension of at least one back portion is slidably adjustable.

6. The apparatus of claim 1 wherein each base portion includes a device for releasably holding a seating unit.

7. The apparatus of claim 6 wherein the device for releasably holding a seating unit slidably receives at least a portion of the base of the seating unit.

8. The apparatus of claim 6 wherein the device for releasably holding a seating unit includes a locking device.

9. A method of preparing seating units for shipment, comprising:
securing a first seating unit to a first seating holding member of an apparatus for shipping seating units, the first seating holding member including a first base portion and a first back portion;
securing a second seating unit to a second seat holding member of the apparatus, the second seat holding member including a second base portion and a second back portion;
rotating at least a portion of the apparatus to a position such that the seating units are inverted with respect to each other and the first base portion is adjacent the second back portion; and
releasably connecting the first back portion with the second back portion.

10. The method of claim 9 wherein the first seating unit is secured to the apparatus in an upright position.

11. The method of claim 9 wherein the second seating unit is secured to the apparatus in an upright position.

12. The method of claim 9 further comprising:
releasably locking the apparatus for shipping seating units in the rotated position.

13. The method of claim 9 further comprising:
asserting a lift-assist force to the apparatus for shipping seating units to facilitate the rotation.

14. The method of claim 9 further comprising:
covering at least a portion of the apparatus.

15. A system for preparing seating units for shipment, comprising:
first means for securing a first seating unit in an upright position to an apparatus for shipping seating units, the first securing means including a first base portion and a first back portion;
second means for securing a second seating unit in an upright position to the apparatus, the second securing means including a second base portion and a second back portion;
means for rotating at least a portion of the apparatus to a position such that the seating units are inverted with respect to each other; and
means for releasably connecting the first back portion with the second back portion.

16. The system of claim 15 further comprising:
means for releasably locking the apparatus for shipping units in the rotated position.

17. The system of claim 15 further comprising:
means for asserting a lift-assist force to the apparatus for shipping seating units to facilitate the rotation.

18. The system of claim 15 further comprising:
means for covering at least a portion of the apparatus.

* * * * *